(12) United States Patent
Shaouy et al.

(10) Patent No.: US 7,735,013 B2
(45) Date of Patent: Jun. 8, 2010

(54) METHOD AND APPARATUS FOR TAILORING CONTENT OF INFORMATION DELIVERED OVER THE INTERNET

(75) Inventors: William Philip Shaouy, Marietta, GA (US); Matthew Bunkley Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 587 days.

(21) Appl. No.: 09/810,992

(22) Filed: Mar. 16, 2001

(65) Prior Publication Data

US 2002/0130902 A1 Sep. 19, 2002

(51) Int. Cl.
G06F 3/00 (2006.01)

(52) U.S. Cl. .................. 715/745; 715/749; 715/744; 715/800

(58) Field of Classification Search .......... 345/745, 345/746, 747, 749, 800, 731, 720, 854, 744; 715/745, 749, 744, 800, 731, 720, 854, 746, 715/747

See application file for complete search history.

(56) References Cited

U.S. PATENT DOCUMENTS

| | | | | |
|---|---|---|---|---|
| 4,599,692 | A | 7/1986 | Tan et al. | 364/513 |
| 5,095,441 | A | 3/1992 | Hopper et al. | 364/489 |
| 5,555,346 | A | 9/1996 | Gross et al. | 395/51 |
| 5,996,086 | A | 11/1999 | Delaney et al. | 714/4 |
| 6,006,035 | A | 12/1999 | Nabahi | 395/712 |
| 6,029,188 | A | 2/2000 | Uyama | 709/102 |
| 6,044,376 | A * | 3/2000 | Kurtzman, II | 707/102 |
| 6,064,980 | A * | 5/2000 | Jacobi et al. | 705/26 |
| 6,083,276 | A | 7/2000 | Davidson et al. | 717/1 |
| 6,169,992 | B1 | 1/2001 | Beall et al. | 707/103 |
| 6,313,921 | B1 * | 11/2001 | Kadowaki | 358/1.15 |
| 6,483,523 | B1 * | 11/2002 | Feng | 345/745 |
| 6,490,601 | B1 * | 12/2002 | Markus et al. | 715/507 |
| 6,556,963 | B1 * | 4/2003 | Tetzlaff | 704/9 |
| 6,574,618 | B2 * | 6/2003 | Eylon et al. | 707/1 |
| 7,072,888 | B1 * | 7/2006 | Perkins | 707/5 |

OTHER PUBLICATIONS

Forecast Pro, Product Description (Oct. 31, 2000) at http://www.forecastpro.com/product_description.htm.*
Http://web.archive.org/web/*/http://www.forecastpro.com.*

\* cited by examiner

*Primary Examiner*—Simon Ke
(74) *Attorney, Agent, or Firm*—Anna L. Linne; Greenblum & Bernstein P.L.C.

(57) ABSTRACT

Adapting information to a user of an application program is provided. An arbiter receives a request object from the application program. The request object contains profile elements that convey characteristics of the user. The profile elements are analyzed by the arbiter, and, based on the outcome of the analysis, the arbiter selects a personalization engine from a plurality of personalization engines. The request object is passed to the selected personalization engine, which accesses a content database to retrieve a personalized content object comprising information tailored to the user. The personalized content object is sent to the application program, which interprets it for the user. Various embodiments include an expert-system arbiter, and an arbiter comprising computer code that is provided according to conventional object-oriented analysis and design methods executing on a programmable processor. The plurality of personalization engines may include a rule-based engine, a collaborative-filtering engine, or a predictive-modeling engine.

23 Claims, 4 Drawing Sheets

METHOD AND APPARATUS FOR TAILORING CONTENT OF INFORMATION DELIVERED OVER THE INTERNET

FIELD OF THE INVENTION

The present invention relates generally to information delivered over the Internet, also known as the worldwide web, and in particular to the tailoring of such information in response to characteristics of an Internet user to minimize information overload.

BACKGROUND OF THE INVENTION

With the advent and rapid growth of the Internet and the World Wide Web, the quantity of information that many people now encounter has brought the term "information overload" into the lexicon. As the quantity of information continues to grow, it becomes increasingly important to tailor the content of information to meet the needs of Internet users—the consumers of information—so that they are not overloaded, and to meet the desires of information providers so that their voices are heard by the intended audience.

In the context of the Internet, the problem of tailoring information to combat information overload has been addressed in two ways. The first way is for the information provider to employ a personalization engine to tailor the information that is sent to the user, where the tailoring is guided by a sketchy characterization of the user that is appended to the message that the user's browser sends to open the information provider's web site. The second way is essentially the same as the first, except that the personalization engine retrieves the sketchy characterization of the user from a database that keeps historical records of the user's past interactions with the information provider.

Although providing some advantage, each of these approaches has its drawbacks. The rapid growth of the Internet has been accompanied by a wide variety of behavior patterns exhibited by Internet users, and a wide variety of equipment types employed by Internet users. Because of this wide variety, a one-size-fits-all approach to tailoring information does not work well, as the information provider cannot today determine with any degree of certainty how to best tailor the information delivered to the user so that potential for information overload is minimized.

Thus there remains a need to tailor the content of information delivered to a user in a way that efficiently accommodates a wide variety of behaviors, situations, and equipment, so that the user is not overloaded and the provider of the information is able to deliver an effective message.

SUMMARY OF THE INVENTION

The present invention provides a way of tailoring the content of information that is effective in dealing with a wide variety of users' behaviors, situational contexts, and equipment.

The user's request is characterized by a request object that includes profile elements, which provide information about the character or situation of the user. The request object (a) is carried in a message that flows from the user's application program such as a web browser to an information provider such as a retailer's web page, or (b) is retrieved from a profile database available to the provider, or (c) is constructed according to a combination of both of the aforementioned. The request object is passed to an arbiter. The arbiter analyzes the profile elements of the request object and, in response to the outcome of the analysis, selects one of a plurality of personalization engines. The personalization engine that the arbiter selects is the personalization engine indicated by the arbiter's analysis to best suit the user's character or situation. The selected personalization engine identifies tailored information that is to be fetched from a content database. The tailored information includes a personalized content object that comprises content elements tailored to the user. The personalized content object is passed to the user's application program for presentation to the user.

In one embodiment of the invention, the arbiter comprises computer code produced by conventional analysis and object-oriented design procedures. In another embodiment of the invention, the arbiter comprises an expert system. Yet another embodiment of the invention includes a business-rule personalization engine, a collaborative-filtering personalization engine, and a predictive-modeling personalization engine.

By drawing upon the power of a personalization engine that is selected by the arbiter in response to analysis of the user's character and situation, the present invention provides a way of tailoring information effectively under widely varying circumstances. This and other aspects of the present invention will become apparent to those skilled in the art after reading the following descriptions of embodiments of the invention when considered together with the drawings.

DETAILED DESCRIPTION OF THE INVENTION

Figure 1:
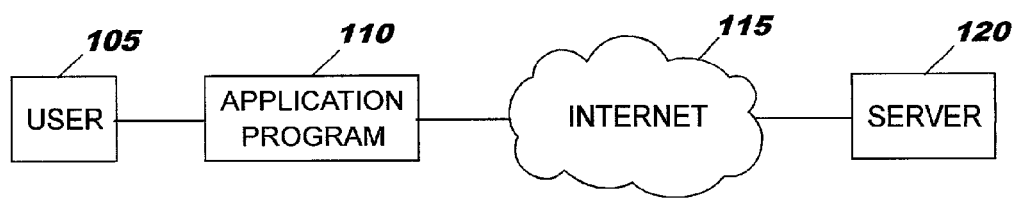
FIG. 1 shows a context suitable for use of the invention.

The invention will now be described more fully, making reference to the accompanying drawings, which show embodiments of the invention. In the drawings and in the description that follows, like numbers refer to like elements throughout. The invention may also be embodied in many different forms; consequently, the invention should not be construed to be limited to the embodiments set forth here. Rather, these embodiments are provided so that this disclosure will be thorough and complete, and will fully convey the scope of the invention to those skilled in the art. As will be appreciated by one of skill in the art, the invention may be embodied as methods or devices. Accordingly, the present invention may take the form of an embodiment entirely in hardware, an embodiment entirely in software, or an embodiment combining hardware and software aspects.

FIG. 1 illustrates an exemplary context suitable for the present invention. As shown in FIG. 1, a user 105, which may be either a human or an automation, interacts with an application program 110. The application program 110 requests information from a server 120 by sending a message over the Internet 115 or over another kind of communication network. In response to receiving the request, the server 120 sends information to the application program 110. For example, the user 105 may be a shopper, the application program 110 may comprise a web browser, and the server 120 may comprise a retailer's web site. In this example, the request may be an HTTP message that flows from the application program 110 to the server 120.

The request sent from the application program 110 to the server 120 characterizes the user 105, in the sense that the request bears data regarding the characteristics of the user 105. This data comprises a set of profile elements, which set is called here a request object 200. Although the request has been introduced here as an HTTP message, and the request object 200 couched accordingly, more generally the request object 200 may be any object provided by the application program to the server 120 where that object characterizes the user 105.

Figure 2A:
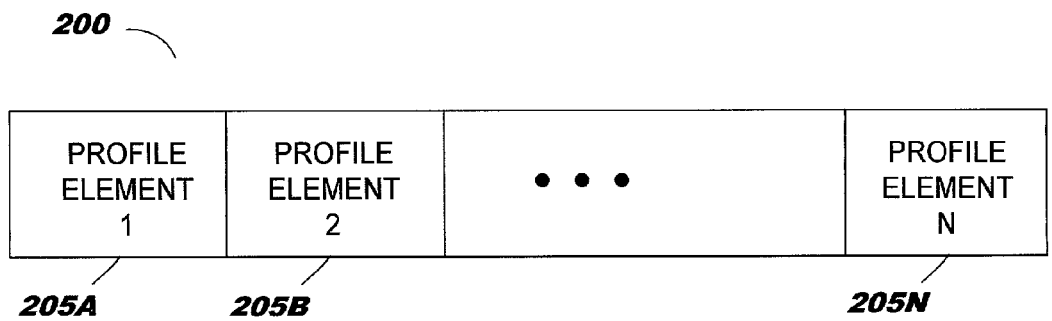
FIG. 2A shows an exemplary structure of a request object sent from a user to an information provider in the context of FIG. 1.

FIG. 2A shows an exemplary request object 200. The request object 200 comprises one or more fields that carry one or more profile elements, which profile elements are shown in FIG. 2A as N profile elements 205A through 205N, where N may have different numerical values for different request objects 200. Each of the N profile elements 205A through 205N gives information regarding the characteristics of the user 105 or the application program 110. Profile elements 205A through 205N may include the user's name, network ID, the user's history of interaction with the server 120 including a retail customer's purchase history and status or context as a valued customer or a first-time customer, items previously viewed or added to a shopping cart, and so forth. The foregoing list of profile elements 205A through 205N is to be construed as illustrative rather than limiting.

Figure 2B:
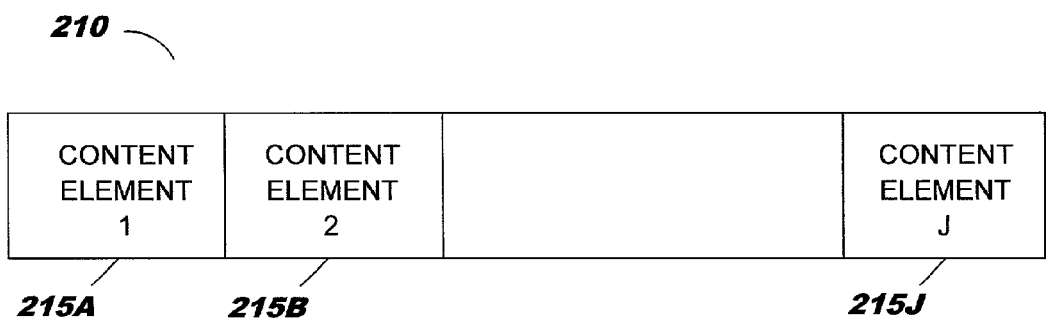
FIG. 2B shows an exemplary structure of a personal content object sent from the information provider of FIG. 2A to the user shown in FIG. 1.

FIG. 2B shows an exemplary personalized content object 210, which comprises information tailored to the advantage of the user 105 or the application program 110, or tailored to the advantage of a party associated with the server 120, for example the retailer mentioned earlier. The personalized content object 210 includes one or more content elements, which are shown in FIG. 2B as J content elements 215A through 215J, where J may have different numerical values for different personal content objects 210. Each of the J content elements 215A through 215J gives information to be sent to the application program 110, which application program 110 may comprise a web browser for interpreting displaying the J content elements 215A through 215J, or information derived therefrom, to the user 105.

For clarity of illustration, the request object 200 and the personalized content object 210 are shown in FIGS. 2A and 2B, respectively, as vectors. This is by way of illustration, and is not a limitation of the present invention. Rather, the request object 200 and the personalized content object 210 are any structures capable of transporting the profile elements 205A through 205N and the content elements 215A through 215J.

Figure 3:
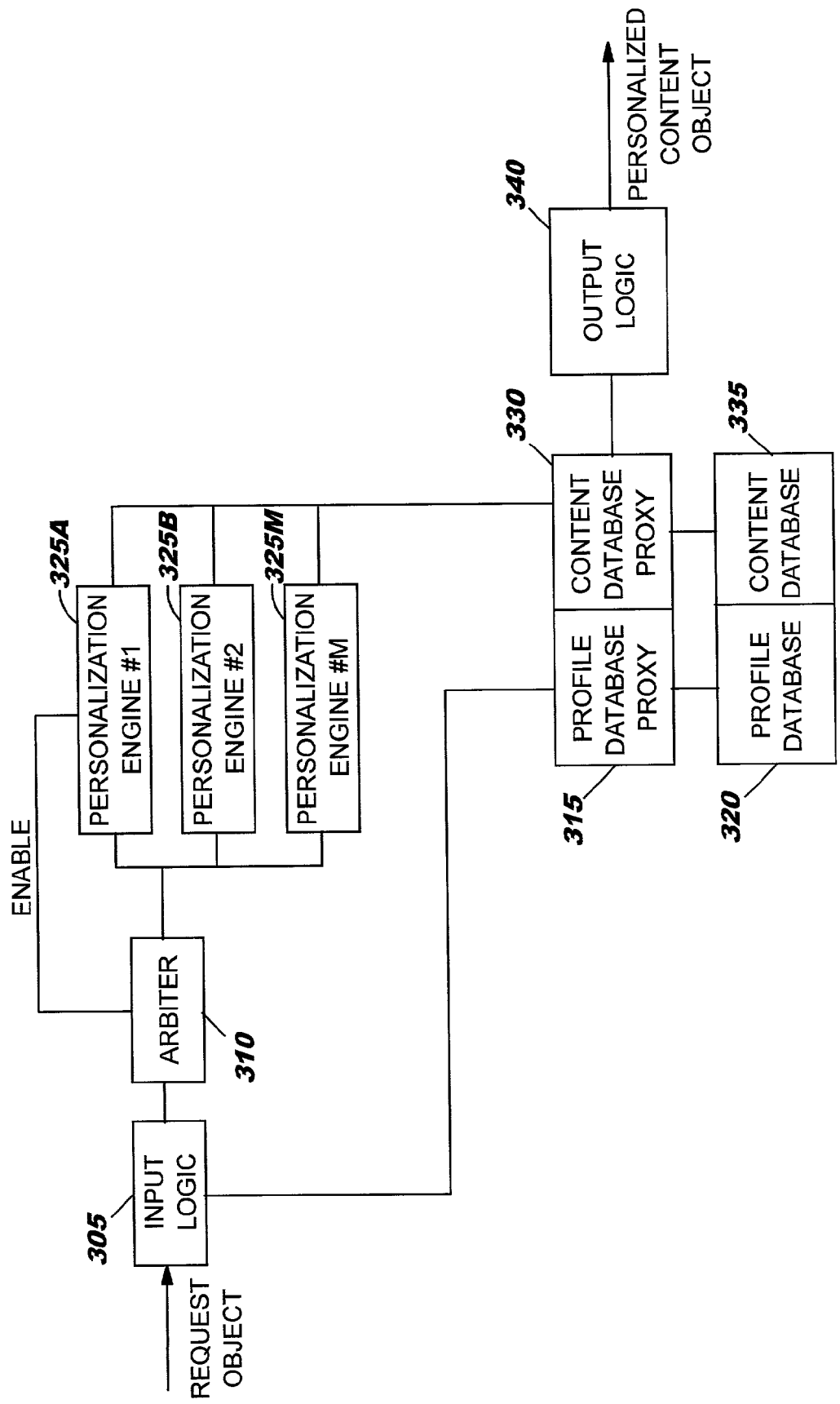
FIG. 3 is a block diagram that shows the structure of an embodiment of the present invention.

FIG. 3 shows a block diagram of one embodiment of the present invention. In FIG. 3, input logic 305 receives the request object 200. The input logic 305 may include a modem or other communication interface or adapter. The input logic 305 accesses a profile database 320 through a profile database proxy 315. The profile database 320 may contain profile elements that are known to the server 120 but not presently included in the request object 200. The input logic 305 incorporates into the request object 200 any such relevant profile elements that are found in the profile database 320.

The input logic 305 passes the request object 200 to an arbiter 310, which is described further hereinbelow, for analysis. The arbiter 310 has at least two outputs. One of these two outputs is the request object 200, which the arbiter 310 passes to one of a plurality of personalization engines 325A through 325M, where M is the count of personalization engines making up the plurality of personalization engines. The personalization engine 325A through 325M are described further hereinbelow. The other of the two outputs of the arbiter 310 is an enable signal that selects and enables one of the plurality of personalization engines 325A through 325M to analyze the request object 200. The personalization engine that is selected and enabled by the arbiter 310 is referred to here as the selected personalization engine 325' (not shown explicitly in the drawings).

The selected personalization engine 325' analyzes the profile elements 205A through 205N of the request object 200. Based on the outcome of this analysis, the selected personalization engine 325' identifies a personal content object 210 stored in a content database 335, and retrieves the identified personal content object 210 through a content database proxy 330. Alternately, the personalization engine can generate new content itself. The content database proxy 330 passes the personalized content object 210 to the output logic 340. The output logic 340 may include a modem or other communication interface or adapter. The output logic 340 passes the personal content object 210 through the Internet 115 to the application program 110. In practice, the profile database 320 and the content database 335 may be combined into a single database, and the profile database proxy 315 and the content database proxy 330 may be combined into a single database proxy.

More generally, the present invention provides the user 105 with information tailored to the benefit of the user 105 or to the benefit of a party associated with the server 120 such as a retailer who has a web site. The function of the selected personalization engine 325' is to decide how information is to be tailored, or more specifically, which personalization content object 210 is to be selected from the content database 335.

At least three kinds of standard personalization engines are known to those skilled in the art. These are known as business-rules engines, collaborative-filtering engines, and predictive-modeling engines, all of which are appropriate for use in the present invention. The present invention is not limited to the use of these standard engines, however, and accommodates other kinds of personalization engines as well, including new or non-standard engines developed to accommodate other circumstances.

One kind of personalization engine may be optimal for one set of circumstances, yet sub-optimal for another set of circumstances. For example, when a great deal is known about past behavior of a large set of users, a collaborative-filtering engine, which is based on statistical clustering, may outperform a business-rules engine or a predictive modeling engine. On the other hand, when the identity of the user is unknown, a predictive-modeling engine, which observes a user's behavior and therefrom makes predictions regarding the nature of the user, may outperform a business-rules engine or a collaborative-filtering engine. Finally, when circumstances change quickly and the operation of the personalization engine needs to change in response to these circumstances, for example in the context of e-commerce web sites that offer cross-sell and up-sell promotions, a business-rules engine may be the most suitable choice.

According to the present invention, the arbiter 310 selects and enables the personalization engine that is expected to provide the best performance given the circumstances of the user 105 or the application program 110. In the present invention, the arbiter 310 may be embodied according to standard object-oriented analysis and design methods, or more generally may comprise an expert system that is rule based, model based, or knowledge based, all of which are appropriate for use in the present invention. The selection made by the arbiter 310 is based on information that is provided by the request object 200 or the profile database 320, or some combination of the request object 200 and the profile database 320, regarding the user 105 or the application program 110. Because the personalization engine that is expected to provide the best available performance is selected from a plurality of personality engines, the present invention provides the best available tailoring of information under a wide range of circumstances.

Figure 4:
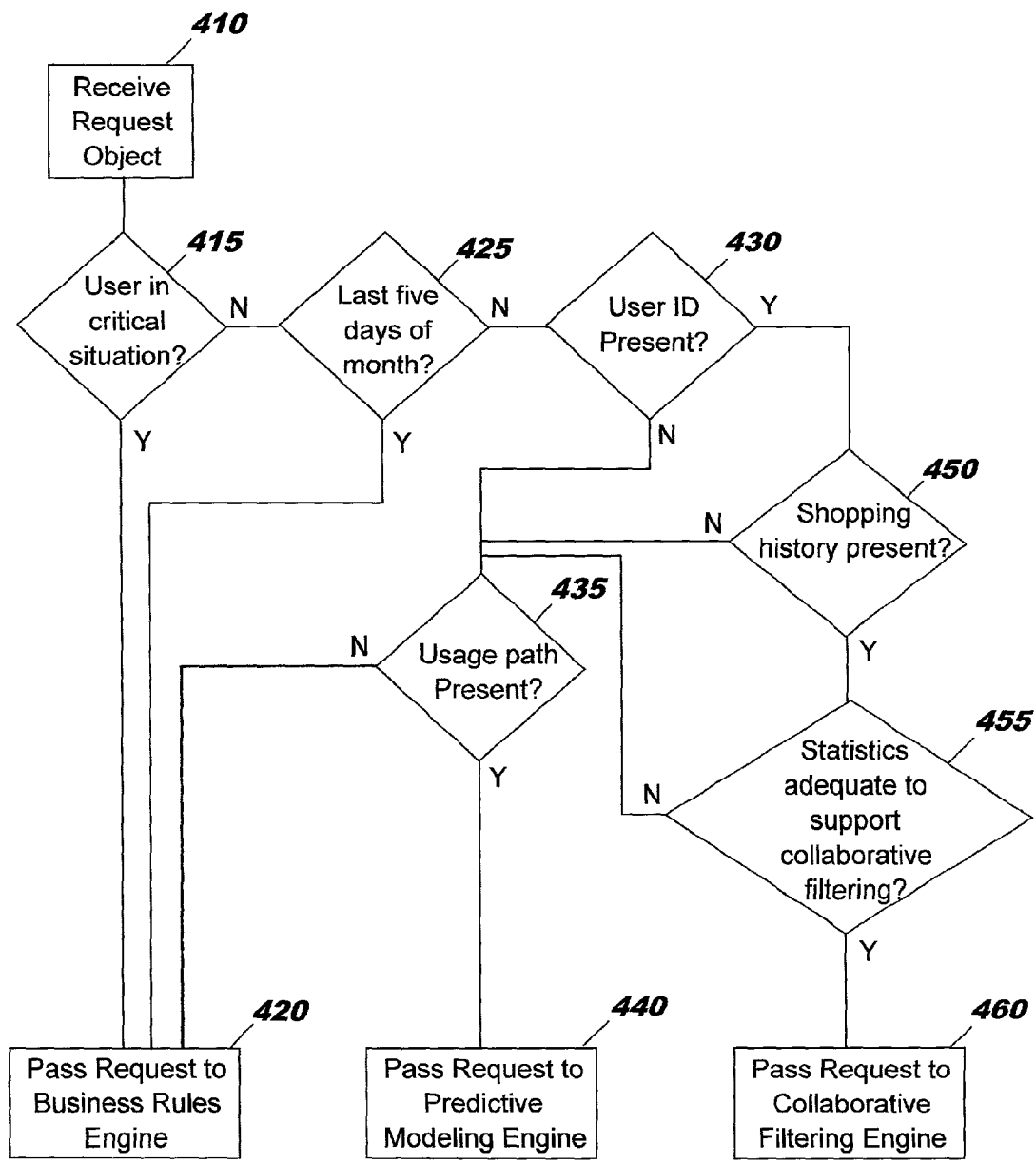
FIG. 4 is a flow diagram that shows the operation of an exemplary arbiter that may be included in the structure illustrated by the block diagram of FIG. 3.

More specifically, FIG. 4 shows an exemplary arbiter 310 that is suitable for use in an online-shopping embodiment of the present invention that has three personalization engines: a business-rules engine, a predictive-modeling engine, and a collaborative-filtering engine.

As shown in FIG. 4, the arbiter 310 receives the request object 200 and examines the profile elements 205A through 205N (step 410). If the user 105 is in a critical situation (step 415), the arbiter 310 selects a business-rules engine as the selected personalization engine 325' and passes the request object 200 to the business-rules engine 325' (step 420). For example, a business-to-business user might be in a critical situation in that they need an item immediately. In this case, execution is passed to the business rules engine, which executes a special set of rules for fast delivery of the item.

Otherwise (i.e., the user 105 is not in a critical situation), the arbiter 310 examines the date of the request object 200 (step 425). If the date of the request object 200 falls within the last five days of a month, the arbiter 310 selects the business-rules engine as the selected personalization engine 325' and passes the request object 200 to the business-rules engine (step 420).

Otherwise (i.e., the date of the request object 200 does not fall within the last five days of the month), the arbiter determines if the identity of the user 105 is known (step 430).

If the ID of the user 105 is not known, the arbiter 310 determines whether the usage or short-term history path of the user 105 is known (step 435).

If the path of the user 105 is not known, the arbiter 310 selects the business-rules engine as the selected personalization engine 325' and passes the request object 200 to the business-rules engine (step 420). Otherwise (i.e., the path of the user 105 is known), the arbiter 310 selects the predictive-modeling engine as the selected personalization engine 325' and passes the request object 200 to the predictive-modeling engine 325' (step 440).

Otherwise (i.e., the ID of the user 105 is known), the arbiter 310 determines whether a shopping history is available (step 450).

If a shopping history of the user 105 is not available, the arbiter 310 determines whether the path of the user 105 is known (step 435). If the path of the user 105 is not known, the arbiter 310 selects the business-rules engine as the selected personalization engine 325' and passes the request object 200 to the business-rules engine (step 420). Otherwise (i.e., the path of the user 105 is known), the arbiter 310 selects the predictive-modeling engine as the selected personalization engine 325' and passes the request object 200 to the predictive-modeling engine 325' (step 440).

Otherwise, (i.e., the shopping history of the user 105 is available), the arbiter 310 determines whether a collaborative filtering engine at the disposal of the arbiter 310 has sufficient statistical knowledge to support a selection of the collaborative filtering engine as the selected personalization engine 325' (step 455). For example, the test for sufficiency may comprise an examination of whether or not 20,000 samples are known to the collaborative filtering engine.

If statistical knowledge is sufficient, the arbiter 310 selects the collaborative-filtering engine as the selected personalization engine 325' and passes the request object 200 to the collaborative-filtering engine 325' (step 460).

Otherwise (i.e., the statistical knowledge is not sufficient), the arbiter 310 determines whether the path of the user 105 is known (step 435). If the path of the user 105 is not known, the arbiter 310 selects the business-rules engine as the selected personalization engine 325' and passes the request object 200 to the business-rules engine (step 420). Otherwise (i.e., the path of the user 105 is known), the arbiter 310 selects the predictive-modeling engine as the selected personalization engine 325' and passes the request object 200 to the predictive-modeling personalization engine 325' (step 440).

Figure 5:
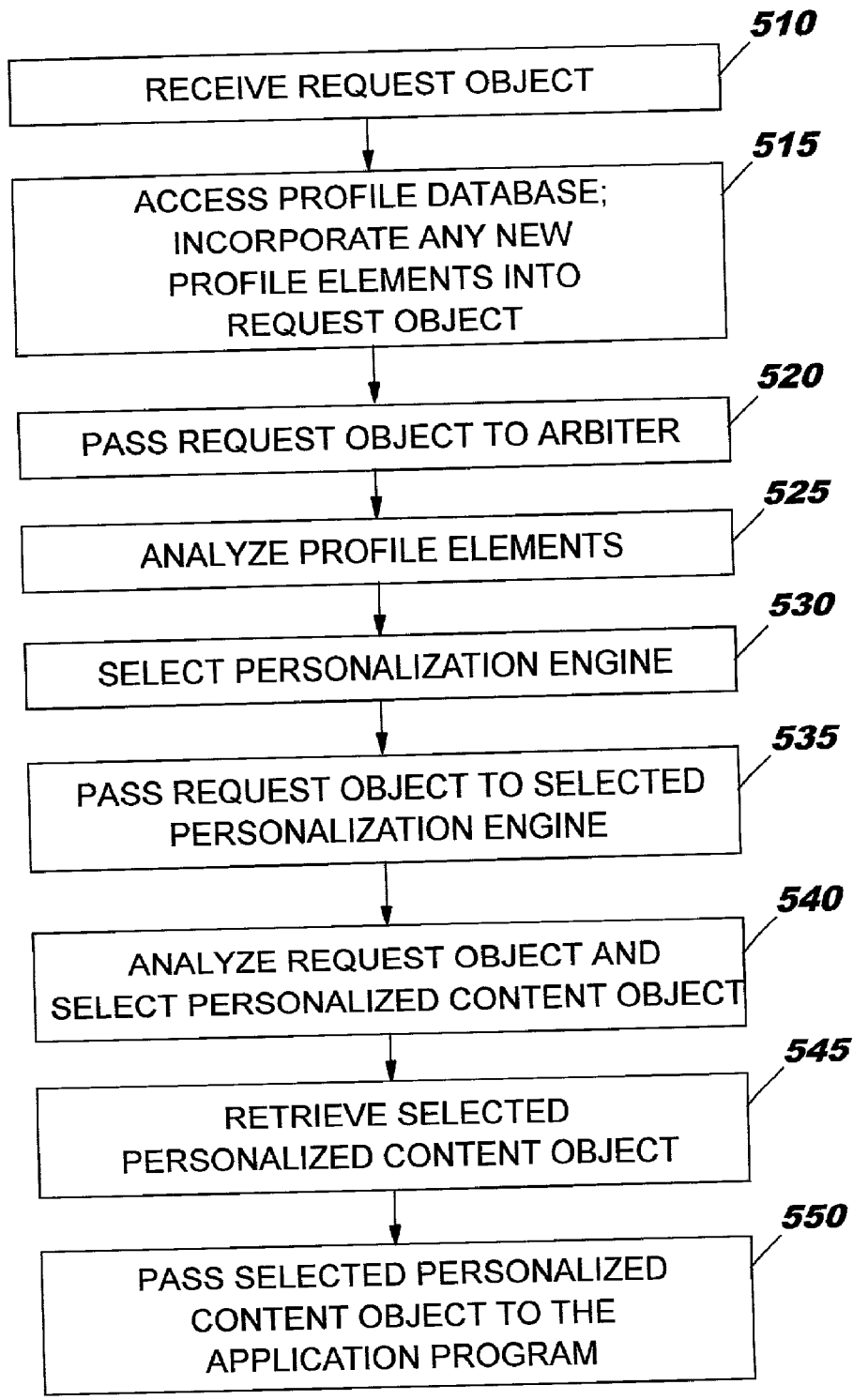
FIG. 5 is a flow diagram that shows aspects of the operation of the invention.

FIG. 5 shows another aspect of the present invention, which aspect is a method of operation of the apparatus shown in FIG. 3, and which may include the operation of the exemplary arbiter 310 discussed above and illustrated in FIG. 4. Although the method of FIG. 5 will now be discussed as it may be performed by the server 120, the method is not limited in its scope to the server 120, and may be used as well by the application program 110 or by a third-party entity (not shown), for example by a service provider.

As shown in FIG. 5, the input logic 305 at the server 120 receives the request object 200 (step 510). The server 120 accesses the profile database 320 through the profile database proxy 315, and incorporates any profile elements found in the profile database 320 into the request object 200 (step 515). The input logic 305 then passes the request object 200 to the arbiter 310 (step 520). The arbiter 310 analyzes the profile elements 205A through 205N of the request object 200 according to the method illustrated in FIG. 4 (step 525) or according to another method as mentioned above. Responsive to this analysis, the arbiter 310 selects a personalization engine to be the selected personalization engine 325' (step 530), and passes the request object 200 to the selected personalization engine 325' (step 535). The selected personalization engine 325' analyzes the request object 200, and based on the outcome of the analysis identifies a personalized content object 210 to be retrieved from the content database 335 (step 540). The selected personalized content object 210 is retrieved through the content database proxy 330 (step 545). The content database proxy 335 passes the personalized content object 210 through the internet 115 to the application program 110 (step 550).

What is claimed:

1. A method executable by a processor for tailoring information to characteristics of an information user, comprising:
   passing a request object excluding any profile elements to an input logic using the processor;
   receiving the request object and accessing a profile database through a profile database proxy using the processor, the profile database containing profile elements that are known to a server but originally excluded from the request object, the profile elements including a user name, network ID, and user interaction history;
   incorporating the request object with relevant profile elements of the profile elements found in the profile database using the processor;
   passing the request object with the relevant profile elements to an arbiter using the processor;
   actively selecting, by analysis of the relevant profile elements using the processor, a personalization engine, which is configured to provide an optimal performance, from a plurality of personalization engines by the arbiter, the arbiter refining and altering a selection based on a number and type of the relevant profile elements, wherein the plurality of personalization engines are a collaborative filtering engine, a predictive-modeling personalization engine, and a business-rules engine, the collaborative filtering engine provides an optimal performance when information is known about a group of users based on statistical knowledge, the predictive-modeling personalization engine provides an optimal performance when a user is unknown based on a short-term usage path of the user, and the business-rules engine provides an optimal performance when the personalization engine needs to change in response to one or more changing circumstances;

accessing a content database via a content database proxy to retrieve a personalized content object identified by the personalization engine selected by the arbiter using the processor; and passing with the arbiter the personalized content object to an application program, wherein the arbiter comprises an expert system that is one of rule based, model based, and knowledge based.

2. The method of claim 1, further comprising using the arbiter for on-line shopping.

3. The method of claim 1, wherein the application program is a web browser.

4. The method of claim 1, further comprising sending the request object over a communication network.

5. The method of claim 4, wherein the communication network is the Internet.

6. The method of claim 1, wherein the plurality of personalization engines comprises at least two personalization engines selected from the group consisting of a rule-based personalization engine, a predictive-modeling personalization engine, and a collaborative filtering personalization engine.

7. The method of claim 1, further comprising the arbiter analyzing at least one of a date of the request object, a user identity, a user shopping history, and a user usage path.

8. The method of claim 1, further comprising using the arbiter for on-line shopping, wherein the application program is a web browser, wherein the request object is an HTTP message and contains data regarding characteristics of a user.

9. The method of claim 8, wherein the request object is sent from the application program to a server.

10. Apparatus for tailoring information in a combination of hardware and software to characteristics of an information user, the apparatus comprising:

a content database;

an input logic for receiving a request object excluding any profile elements and accessing a profile database through a profile database proxy, the profile database containing profile elements that are known to a server but originally excluded from the request object, the input logic configured to incorporate into the request object any relevant profile elements of the profile elements found in the profile database including a user name, network ID, and user interaction history;

an arbiter for accepting and analyzing a request object having the relevant profile elements, which is passed by the input logic, the arbiter refining and altering a selection based on a number and type of at least one of the profile elements contained in the request object;

a plurality of personalization engines for selecting at least one personalized content object from the content database, wherein the plurality of personalization engines are a collaborative filtering engine, a predictive-modeling personalization engine, and a business-rules engine, the collaborative filtering engine provides an optimal performance when information is known about a group of users based on statistical knowledge, the predictive-modeling personalization engine provides an optimal performance when a user is unknown based on a short-term usage path of the user, and the business-rules engine provides an optimal performance when the personalization engine needs to change in response to one or more changing circumstances;

the arbiter selecting a personalization engine from the plurality of personalization engines, and the selected personalization engine selects the at least one personalization content object from the content database via a content database proxy; and the arbiter passing the personalized content object to an application program, wherein the arbiter comprises an expert system that is one of rule based, model based, and knowledge based.

11. The apparatus of claim 10, further comprising output logic for passing the at least one personalization content object to an application program over a communication network.

12. The apparatus of claim 11, wherein the communication network is the Internet.

13. The apparatus of claim 11, wherein the application program is a web browser.

14. The apparatus of claim 10, wherein the arbiter is configured to receive the request object from a user and the profile elements from the profile database.

15. The apparatus of claim 10, wherein the arbiter is configured to analyze at least one of a date of the request object, a user identity, a user shopping history, and a user usage path.

16. The apparatus of claim 10 wherein the arbiter is utilized for on-line shopping, wherein the application program is a web browser, wherein the request object is an HTTP message and contains data regarding characteristics of a user.

17. The apparatus of claim 16, wherein the request object is sent from the application program to the server.

18. A method executable by a processor for tailoring information delivered to a user, comprising:

passing a request object excluding any profile elements to an input logic using the processor;

receiving the request object and accessing a profile database through a profile database proxy using the processor, the profile database containing profile elements that are known to a server but originally excluded from the request object, the profile elements including a user name, network ID, and user interaction history;

incorporating the request object with relevant profile elements of the profile elements found in the profile database using the processor;

passing the request object with the relevant profile elements to an arbiter using the processor;

selecting with the arbiter a personalization engine by analysis of the relevant profile elements, wherein the personalization engine is at least one of a collaborative filtering engine, a predictive-modeling personalization engine, and a business-rules engine, the collaborative filtering engine provides an optimal performance when information is known about a group of users based on statistical knowledge, the predictive-modeling personalization engine provides an optimal performance when a user is unknown based on a short-term usage path of the user, and the business-rules engine provides an optimal performance when the personalization engine needs to change in response to one or more changing circumstances;

selecting with the personalization engine a personalized content object to tailor information provided to the user, wherein the personalized content object is stored in a content database and accessed via a content database proxy; and using the arbiter for on-line shopping, wherein the arbiter comprises an expert system that is one of rule based, model based, and knowledge based.

19. The method of claim 18, further comprising the arbiter receiving the request object from a user, and sending the selected personalized content object to the user's application program.

20. The method of claim 19, wherein the application program is a web browser.

21. The method of claim 18, further comprising the arbiter receiving the profile elements from the profile database.

22. The method of claim 18, further comprising sending the request object over a communication network.

23. The method of claim 22, wherein the communication network is the Internet.

* * * * *